United States Patent
Tang

(10) Patent No.: US 8,424,623 B2
(45) Date of Patent: Apr. 23, 2013

(54) HYBRID POWER SYSTEM AND ITS CONTROLLING METHOD

(75) Inventor: Xiaohua Tang, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 794 days.

(21) Appl. No.: 12/494,569

(22) Filed: Jun. 30, 2009

(65) Prior Publication Data

US 2009/0321161 A1 Dec. 31, 2009

(30) Foreign Application Priority Data

Jun. 30, 2008 (CN) .......................... 2008 1 0129196

(51) Int. Cl.
*B60W 20/00* (2006.01)
(52) U.S. Cl.
USPC ................................ 180/65.265; 180/65.25
(58) Field of Classification Search ............... 180/65.25, 180/65.265, 65.28, 65.285
See application file for complete search history.

(56) References Cited

U.S. PATENT DOCUMENTS

| | | | |
|---|---|---|---|
| 5,343,970 A | 9/1994 | Severinsky | |
| 5,713,814 A * | 2/1998 | Hara et al. ......................... 477/5 |
| 5,820,172 A * | 10/1998 | Brigham et al. ............ 290/40 C |
| 6,022,290 A | 2/2000 | Lyon | |
| 6,116,363 A | 9/2000 | Frank | |
| 6,232,744 B1 * | 5/2001 | Kawai et al. ................... 320/132 |
| 6,378,636 B1 * | 4/2002 | Worrel ......................... 180/65.25 |
| 6,428,444 B1 * | 8/2002 | Tabata ............................. 477/3 |
| 6,522,959 B1 * | 2/2003 | Sawamura et al. ............. 701/22 |
| 6,814,170 B2 * | 11/2004 | Abe et al. ................... 180/65.25 |
| 6,892,541 B2 * | 5/2005 | Suzuki ........................... 60/706 |
| 7,398,845 B2 * | 7/2008 | Kuang et al. ............. 180/65.265 |
| 7,463,958 B2 * | 12/2008 | Suzuki ........................... 701/22 |
| 7,673,714 B2 * | 3/2010 | Soliman et al. ......... 180/65.265 |
| 7,774,109 B2 * | 8/2010 | Bajwa ............................. 701/22 |
| 7,775,310 B2 * | 8/2010 | Andri ......................... 180/65.28 |
| 7,841,433 B2 * | 11/2010 | Soliman et al. ......... 180/65.265 |
| 7,844,375 B2 * | 11/2010 | Hung et al. ..................... 701/22 |
| 7,891,450 B2 * | 2/2011 | Soliman et al. ......... 180/65.265 |
| 7,971,667 B2 * | 7/2011 | Yamazaki ................. 180/65.265 |
| 8,091,663 B2 * | 1/2012 | Ichikawa ................. 180/65.265 |

FOREIGN PATENT DOCUMENTS

CN 2513818 Y 10/2002
WO WO 99/21263 4/1999

OTHER PUBLICATIONS

European Search Report dated Oct. 29, 2009, issued with regard to Application No. 09164209.0-1264.

* cited by examiner

*Primary Examiner* — Jeffrey J Restifo
(74) *Attorney, Agent, or Firm* — Brinks Hofer Gilson & Lione

(57) ABSTRACT

A hybrid power system includes an engine, a clutch, a transmission, a motor and an energy storage device. The motor is connected to the energy storage device and the engine is connected to the input shaft of the transmission by the clutch. The output shaft of the transmission is operatively coupled with the output shaft of the motor to provide a coupled power output.

12 Claims, 4 Drawing Sheets

HYBRID POWER SYSTEM AND ITS CONTROLLING METHOD

CROSS-REFERENCE TO RELATED APPLICATIONS

This application claims the benefit of priority to Chinese Patent Application No. 2008-10129196.9 filed on Jun. 30, 2008, for which application is incorporated by reference herein in their entirety.

FIELD OF TECHNOLOGY

This application relates to a hybrid power system and its controlling method.

BACKGROUND OF THE INVENTION

Current hybrid power system generally comprises an engine, a clutch, a motor and an energy storage device. The motor is connected to the energy storage device; the engine is connected to the input shaft of the transmission by the clutch; the input shaft of the transmission is operatively coupled with the output shaft of the motor; so the power of the engine and the motor is output through the output shaft of the transmission. The power will be interrupted for a while when shifting in above system, which will affect the power continuity of the hybrid power system.

SUMMARY

A hybrid power system comprises an engine, a clutch, a transmission, a motor and an energy storage device. The motor is connected to the energy storage device; the engine is connected to the input shaft of the transmission by the clutch. The output shaft of the transmission is operatively coupled with the output shaft of the motor to provide a coupled power output.

A method for controlling a hybrid power system includes setting a work mode based on a current vehicle velocity and a storage level of the energy storage device, wherein the work mode is set as an electric-only power mode or a parallel mode; if the work mode is set to the electric-only power mode, then assigning a power level such that an output power of the motor is based on the power demanded, and wherein the output power of the engine is 0; if the work mode is set to the parallel mode, then assigning a power level such that an output power of the engine and an output power of the motor are both assigned based on a rotational speed of the engine In this hybrid power system, the output shaft of the transmission is connected with the output shaft of the motor, if no power outputs when shifting, the power may be output by the motor, which let the power of the hybrid power system to be continuous and no power interruption.

DETAILED DESCRIPTION OF THE PREFERRED EMBODIMENTS

Figure 1:
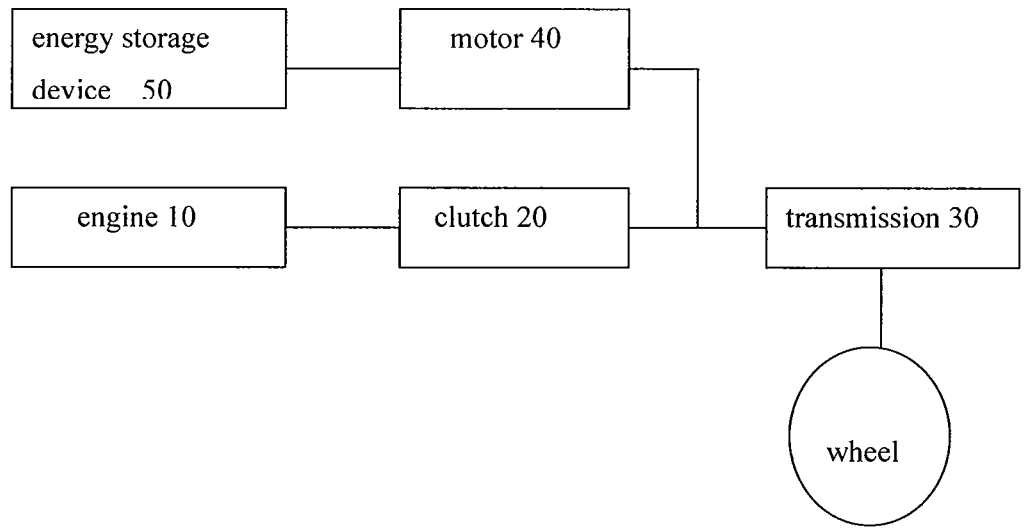
FIG. 1 shows an example of current hybrid power system.
Figure 2:
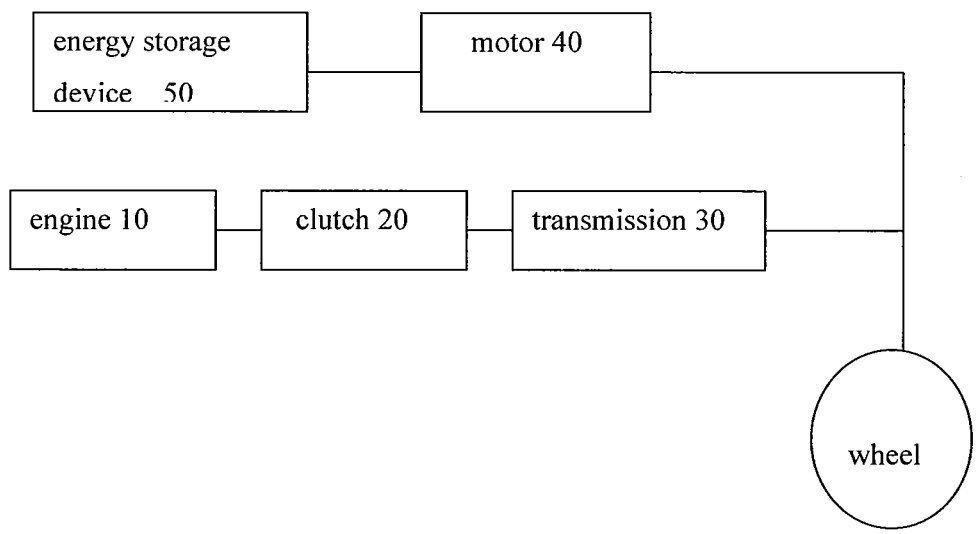
FIG. 2 shows an example of the hybrid power system.

FIG. 2 shows a hybrid power system including an engine 10, a clutch 20, a transmission 30, a motor 40 and an energy storage device 50. The motor 40 is connected to the energy storage device 50; the engine 10 is connected to the input shaft of the transmission 30 by the clutch 20. The output shaft of the transmission 30 is operatively coupled with the output shaft of the motor to provide a coupled power output. The method connecting of the output shaft of the transmission and the output of the motor may be known method, and the spline connection is preferred.

Figure 3A:
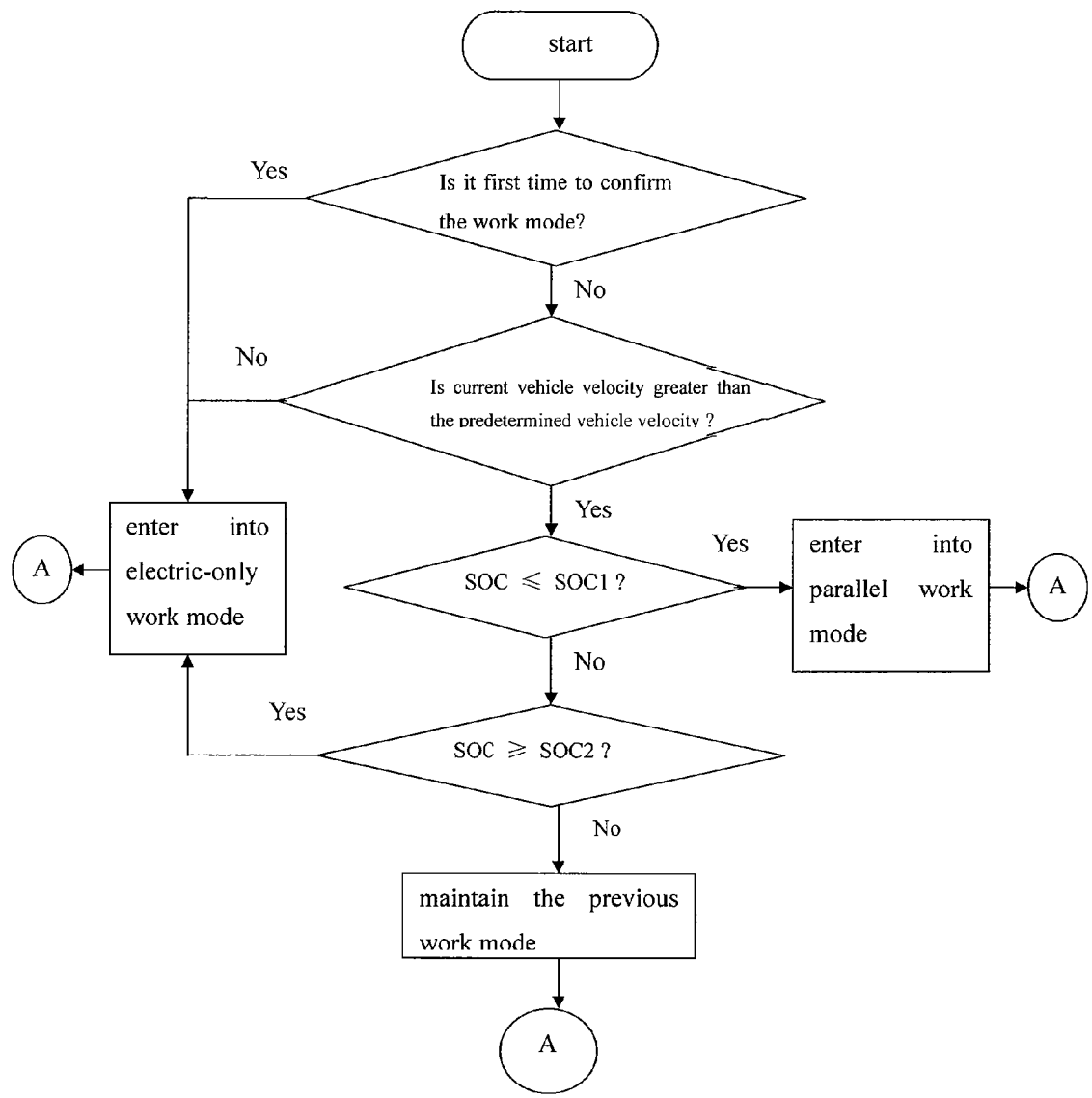
FIG. 3A shows an example of the flow chart of the hybrid power system controlling method.
Figure 3B:
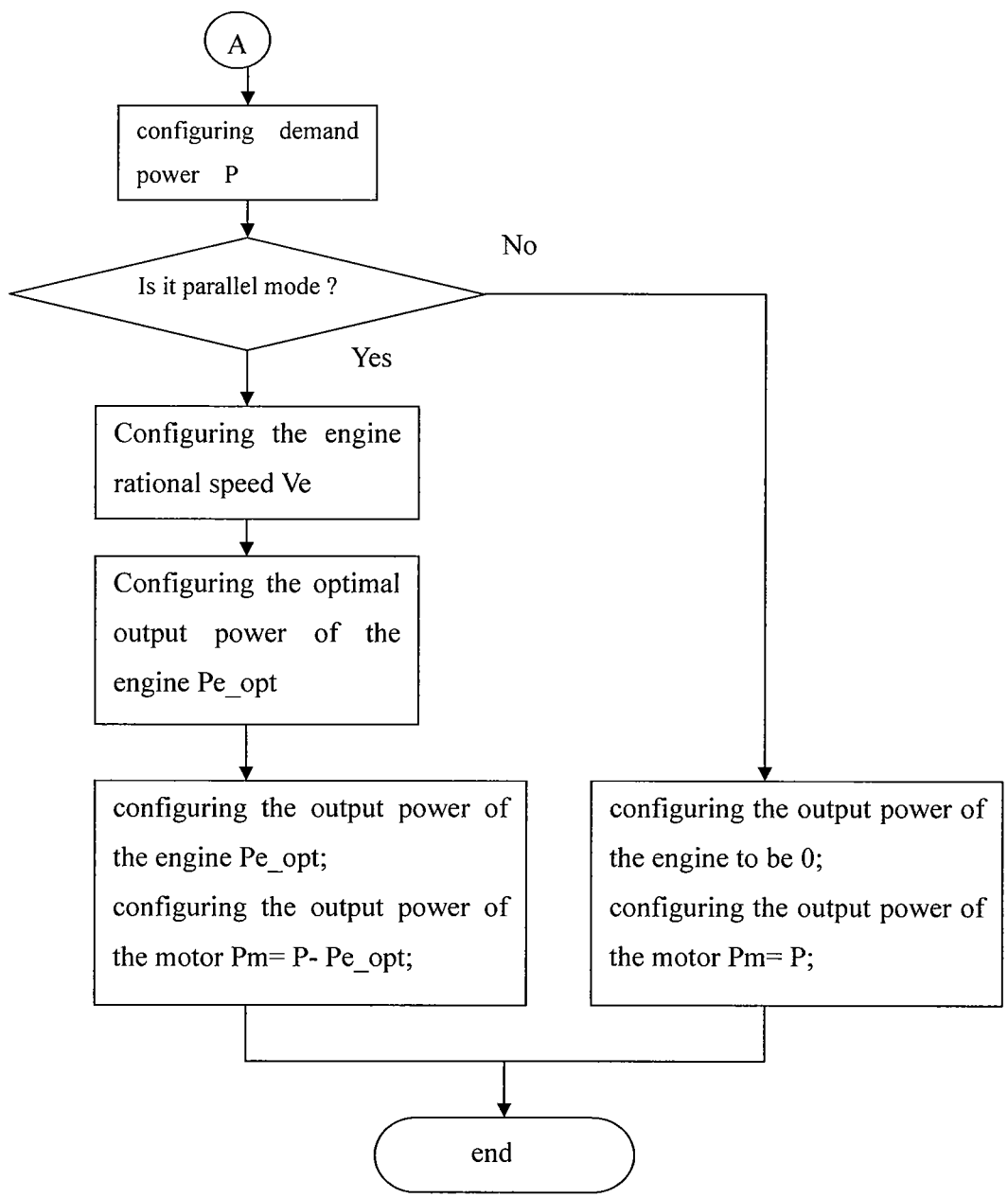
FIG. 3B shows another example of the flow chart of the hybrid power system controlling method.

The present invention provide a controlling method of above hybrid power system. The method comprises setting a work mode of the hybrid power system and assigning the power in the parallel mode. FIG. 3A and FIG. 3B are the flow chart of the controlling method; FIG. 3A is an example of the flow chart of setting the work mode; FIG. 3B is an example of the flow chart of assigning the power. Below the controlling method will be described with FIG. 3A and FIG. 3B.

A method for controlling a hybrid power system includes setting a work mode based on a current vehicle velocity and a storage level of the energy storage device 50, wherein the work mode is set as an electric-only power mode or a parallel mode; if the work mode is set to the electric-only power mode, then assigning a power level such that an output power of the motor 40 is based on the power demanded, and wherein the output power of the engine 10 is 0; if the work mode is set to the parallel mode, then assigning a power level such that an output power of the engine 10 and an output power of the motor 40 are both assigned based on a rotational speed of the engine 10.

Figure 4:
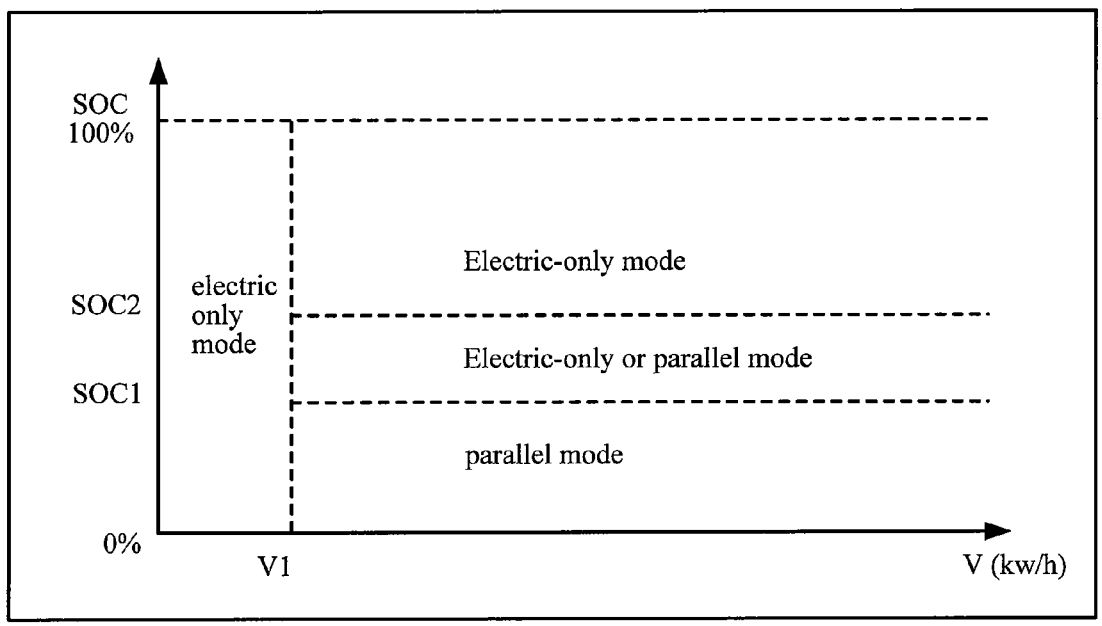
FIG. 4 shows an example of the relation of the work mode with the current vehicle velocity and SOC of the hybrid power system.

The process of setting the work mode includes determining if the work mode is set for a first time; if the work mode is being set for a first time, then set the work mode to the electric-only mode; if the work mode is not being set for a first time, then compare a current vehicle velocity with a predetermined vehicle velocity; if the current vehicle velocity is less than the predetermined vehicle velocity V1, then the work mode is set to the electric-only mode; if the current vehicle velocity is equal to or greater than the predetermined vehicle velocity V1, then the work mode is set to the electric-only mode or the parallel mode according to a storage value (SOC) of the energy storage device 50. The predetermined vehicle velocity V1 is the velocity when the engine works in the lowest rotational speed. FIG. 4 shows the relation of the work mode with the current vehicle velocity and SOC of the hybrid power system. When the current vehicle velocity is less than the predetermined vehicle velocity V1, the engine 10 should work on a rotational speed which is less than the minimum rotational speed, so the engine 10 can't work in this condition and only the motor 40 works, the work mode is the electric-only mode. When the current vehicle velocity is greater than the predetermined vehicle velocity V1, the energy of the energy storage device 50 should be considered further to set the work mode of the hybrid power system. V1 is the vehicle velocity. The decelerator has a fixed reduction ratio, V1 corresponds to a rotational speed of the engine, this rotational speed is preferred to be the lowest rotational speed in the high efficiency zone of the engine. If the rotational speed is less, the fuel efficiency of the engine decrease. In present system, the preferred rotational speed is about 1500 rpm, and a preferred predetermined vehicle velocity V1 is about 45 km/h.

Generally, the energy storage device 50 has the lower discharge limit SOC1 and an upper charge limit SOC2, and 0%<SOC1<SOC2<100%; SOC1 is the remaining capacity, which can drive the vehicle at least 10 km in electric-only mode, if the storage value is less than it, the continuous driving ability cannot be ensured. In present system, SOC1 is preferred to 10%. SOC2 is the sufficient storage value, which can drive the vehicle continuously over 60 km in hybrid mode. In present system, SOC2 is preferred to 60%. When the current vehicle velocity is greater than the predetermined vehicle velocity, the work mode of the hybrid power system is set by comparing the storage value SOC with SOC1 and SOC2 of the energy storage device 50. When SOC≦SOC1, the work mode is set to the parallel mode; when SOC1<SOC<SOC2, the work mode is set to the previous mode; when SOC2≦SOC2, the work mode is set to be the electric-only mode. The lower discharge limit SOC1 is decided by the performance of the energy storage device 50, such as 10%; the upper charge limit SOC2 may be 60% to avoid the excessive consumption of the fuel when the engine 10 was used to generate the power too much. The electricity quantity of the energy storage device 50 is used for driving by above work mode setting process, which reduces the fuel consumption of the engine 10.

When the engine 10 is in a definite rotational speed, the different output power is corresponding to the different output efficiency, namely there is an optimal output power for every rotational speed to meet the optimal output efficiency. When it is not the optimal output power of the engine 10 in some definite rotational speed, the fuel can't be fully burned, which will lose some fuel and the environment will be polluted by exhausting gas. To reduce the energy waste and protect the environment, the output power of the engine 10 should be considered first when assigning the power in the parallel mode. The detailed assigning process of the controlling method of present invention in the parallel mode comprises the following steps: configuring the demand power P based on the maximum output power P_max of the hybrid power system and the current depth Acc of the accelerator pedal, using the formula P=P_max×Acc to calculate; configuring the optimal output power Pe_opt of the engine 10 based on the current rotational speed of the engine 10; controlling the output power of the engine 10 to be the optimal output power Pe_opt, controlling the output power of the motor 40 to be the difference of the demand power P and the optimal output power Pe_opt of the engine 10. When the difference of P and Pe_opt is positive number, the motor 40 is in driving; when the difference of P and Pe_opt is negative number, the motor 40 is in generating power. Which assigns the output power of the engine 10 and the motor 40 and meet the work efficiency of the engine 10; the engine 10 may work on the maximum efficiency.

The process of configuring the optimal output power of the engine comprises the following steps: checking the rotational speed of the engine 10; determining the optimal output power that corresponds to the rotational speed according to the rotational speed-power contrast table of the engine 10. The rotational speed-power contrast table generally is stored in the controller of the engine 10.

The rotational speed of the engine 10 can be obtained by following method: (1) Calculating the rotational speed Ve by the reduction ratio i of wheel rotational speed of current gear and that of the engine 10, and the wheel radius r, the formula is $$Ve = \frac{v}{2\pi r \times i}; \quad (2)$$

Configuring the rotational speed of the engine 10 by setting the detecting sensor of the rotational speed in the engine 10. Certainly, it isn't only above two methods to configure the rotational speed of the engine 10, other common method in this art may be used.

A shifting process of the hybrid power system comprises the following steps: decreasing the input power of the engine 10 and increasing the output power of the motor 40 so that the sum of output power of the engine 10 and the motor remains unchanged; disengaging the clutch 20 and shifting the transmission 30 to a new gear level when the output power of the engine 10 is reduced to 0; after shifting the transmission, adjusting the rotational speed of the engine 10 based on the new gear level, and engaging the clutch 20; after engaging the clutch 20, configuring the output power of the engine 10 to optimal output power corresponding to the rotational speed of the engine 10.

In the above shifting process, by increasing the output power of the motor 40 while reducing the power output of the engine 10, the total output power of the hybrid power system remains constant, which ensures the power continuity of the whole power system. The process of adjusting the output power of the motor 40 by communication of the engine controller and the motor controller includes the steps of: the controller of the engine 10 sending the signal of the output power of the engine 10 to the controller of the motor 40 by the communication system; after receiving the message, the controller of the motor 10 adapting the output power of the motor 10 according to the whole power that the vehicle required, to keep the sum of the output power of the motor 40 and the engine 10 is equal to the vehicle power demand. The communication speed is generally less than 10 ms. In present system, the preferred communication speed is about 8 ms, namely, the controller of the motor 40 can receive the signal of the output power of the engine 10 every 8 ms and adapt the output power of the motor 40 every 0.1 ms. That is, every time the output power of the engine 10 is received, the controller of the motor 40 will adapt its output power 80 times to meet the demand output power. The steps of configuring the engine 10 to the optimal output power in above shifting process is the same as that of assigning the power, and thus will not be described.

Although the preferred embodiments of the present invention have been described above, the present invention is not limited to the above words, and those who are skilled in this field shall understand that many amendments, replacements or variations may be made according to the present invention, which are all within the scope of protection of the present invention.

I claim:

1. A method for controlling a hybrid power system, the hybrid power system including an engine, a clutch, a transmission coupled to the engine, an electric motor, and an energy storage device coupled to the motor, the method comprising the steps of:
   setting a work mode based on a current vehicle velocity and a storage level of the energy storage device, wherein the work mode is set as an electric-only power mode or a parallel mode;
   if the work mode is set to the electric-only power mode, then assigning a power level such that an output power of the motor is based on the power demanded, and wherein the output power of the engine is 0; and
   if the work mode is set to the parallel mode, then assigning a power level such that an output power of the engine and an output power of the motor are both assigned based on a rotational speed of the engine.

2. The method of the claim 1, wherein in the parallel mode, the step of assigning power includes:
   configuring a demand power based on a maximum output power of the hybrid power system and a current depth of the accelerator pedal;
   configuring an optimal output power of the engine based on a rotational speed of the engine;
   controlling an output power of the engine to be the optimal output power; and
   controlling the output power of the motor to be the difference of the demand power and the optimal output power of the engine.

3. The method of the claim 2, wherein the step of configuring the optimal output power of the engine includes the steps of:
   checking a rotational speed of the engine; and
   determining an optimal output power that corresponds to the rotational speed according to a rotational speed-power contrast table of the engine.

4. The method of claim 1, wherein the step of setting the work mode comprises the steps of:
   determining if the work mode is set for a first time;
   if the work mode is being set for a first time, then set the work mode to the electric-only mode;
   if the work mode is not being set for a first time, then compare a current vehicle velocity with a predetermined vehicle velocity;
      if the current vehicle velocity is less than the predetermined vehicle velocity, then the work mode is set to the electric-only mode; and
      if current vehicle velocity is equal to or greater than the predetermined vehicle velocity, then the work mode is set to the electric-only mode or the parallel mode according to a storage value (SOC) of the energy storage device.

5. The method of claim 4, wherein the predetermined vehicle velocity is about 45 km/h.

6. The method of claim 4, wherein the predetermined vehicle velocity is a velocity when the engine works in a lowest rotational speed.

7. The method of claim 6, wherein SOC1 is about 10%.

8. The method of claim 6, wherein SOC2 is about 60%.

9. The method of claim 8, including a process of adapting the output power of the motor by the communication of the engine controller and the motor controller, comprising the steps of:
   the engine controller sending the signal of the output power of the engine to the motor controller;
   after receiving the signal, the motor controller adapting the output power of the motor according to a whole vehicle power demand.

10. The method of claim 4, wherein the energy storage device has a discharge lower limit (SOC1) and an upper charge limit (SOC2), wherein $0\% < SOC1 < SOC2 < 100\%$;
    if the current vehicle velocity is greater than the predetermined vehicle velocity, then:
    the work mode is set to the parallel mode if $SOC \leq SOC1$;
    the work mode is set to the electric-only mode if $SOC \geq SOC2$; and
    the work mode is set to a previously set mode if $SOC1 < SOC < SOC2$.

11. The method of the claim 10, wherein configuring the engine to the optimal output power comprises the steps of:
    determining a rotational speed of the engine; and
    determining an optimal output power that corresponds to the rotational speed according to a rotational speed-power contrast table of the engine.

12. The method of claim 1, including a shifting process comprising the steps of:
    decreasing an input power of the engine and increasing an output power of the motor so that a sum of the output power of the engine and the motor remains unchanged;
    disengaging the clutch and shifting a transmission to a new gear level when the output power of the engine is reduced to 0;
    after shifting the transmission, adjusting the rotational speed of the engine based on the new gear level, and engaging the clutch; and
    after engaging the clutch, configuring an output power of the engine to an optimal output power corresponding to a rotational speed of the engine.

* * * * *